United States Patent [19]

Solow

[11] 3,731,165
[45] May 1, 1973

[54] TRIMMER CAPACITOR WITH SLOTTED PISTON

[75] Inventor: Benjamin Solow, North Hollywood, Calif.

[73] Assignee: JFD Electronics Corp., Brooklyn, N.Y.

[22] Filed: Oct. 4, 1971

[21] Appl. No.: 185,988

[52] U.S. Cl. ............................................317/249 T
[51] Int. Cl. ................................................H01g 5/14
[58] Field of Search......................317/249 R, 249 T, 317/253

[56] References Cited

UNITED STATES PATENTS

| | | | |
|---|---|---|---|
| 932,111 | 8/1909 | Fessenden | 317/249 R |
| 2,544,550 | 3/1951 | Bird | 317/249 T |
| 2,578,429 | 12/1951 | Karplus | 317/249 R |
| 2,607,826 | 8/1952 | Barnes | 317/249 T |
| 2,673,933 | 3/1954 | Morton | 317/249 T |
| 2,747,147 | 5/1956 | Shull | 317/249 T |
| 2,748,327 | 5/1956 | Wadworth | 317/249 T |
| 3,302,150 | 1/1967 | Lyman | 317/249 T |

Primary Examiner—E. A. Goldberg
Attorney—Ostrolenk, Faber, Gerb & Soffen

[57] ABSTRACT

The movable piston of a piston trimmer capacitor has shallow narrow slots extending along its outer surface either longitudinally, or helically, to adjust the maximum capacitance of the unit while maintaining a close fit within a surrounding dielectric tube. Short slots are also placed at various longitudinal locations along the piston to adjust the functional relation between capacitance and piston position.

11 Claims, 5 Drawing Figures

PATENTED MAY 1 1973 3,731,165
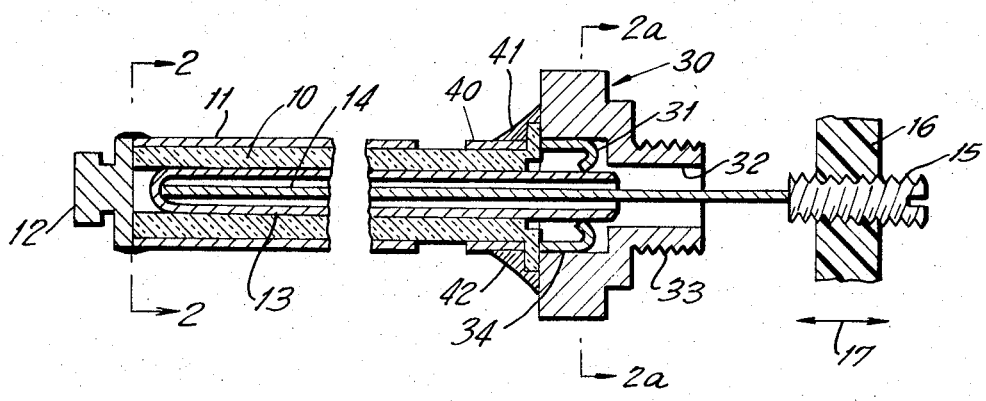
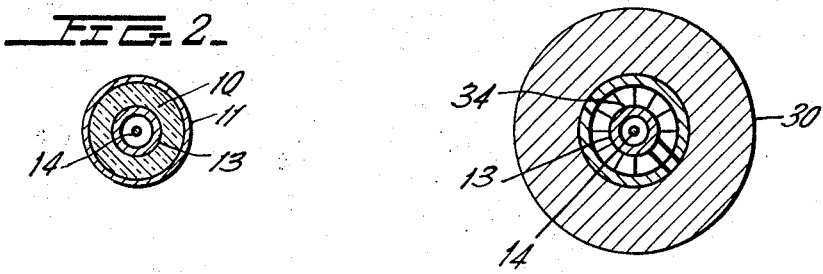
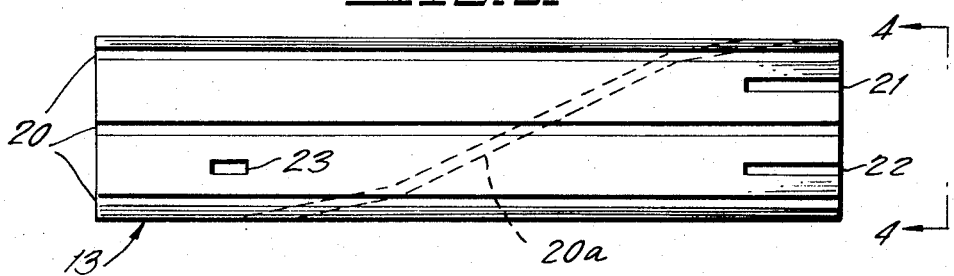
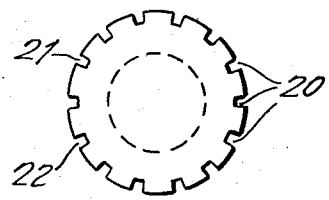
INVENTOR.
BENJAMIN SOLOW
BY
Ostrolenk, Faber, Gerb & Soffen.
ATTORNEYS

TRIMMER CAPACITOR WITH SLOTTED PISTON

BRIEF SUMMARY OF THE INVENTION

This invention relates to piston trimmer capacitors, and more specifically relates to the provision of shallow elongated slots in the surface of a piston electrode to control maximum capacitance while still maintaining a close fit between the piston and its surrounding dielectric tube.

Piston trimmer capacitors are well known and are described, for example, in U. S. Pat. No. 3,274,465 to Spielman and Taub, entitled TWO-POSITION TRIMMER CAPACITOR, and assigned to the assignee of the present invention. Capacitors of this type are commonly ganged together for radio tuning purposes and are commercially available, for example, from the assignee, JFD Electronics Corp., under the name of MODULAR MULTIGANG COMPACTUNER. In such devices, a plurality of individual trimmer capacitors are simultaneously adjusted by a common adjustment knob. Each individual trimmer capacitor consists of a dielectric cylinder, which may be of glass, quartz, or a suitable ceramic, with the dielectric cylinder carrying a stationary conductive electrode band. This band may be on the outer surface of the dielectric tube, or may be of the embedded variety in which the band is formed on a thin walled dielectric tube, which is covered on its outside by a heavier dielectric tube. This construction permits higher maximum capacitance since the stator electrode is closer to the movable electrode of the capacitor.

A conductive piston, which is accurately machined to fit closely within the dielectric cylinder, then serves as the movable electrode of the capacitor.

It is important that the piston fit within the dielectric cylinder with very close tolerances since a loose fit creates an unintentional and variable air gap between the piston surface and the dielectric interior. By way of example, in a typical capacitor having a piston diameter of 0.210 inch and a dielectric tube thickness to an embedded band electrode of about 2 mils, a 5 microinch air gap (or tolerance) can cause a variation in capacitance of about 1 percent. In a like manner, a variation in dielectric wall thickness of 20 microinches will also cause a change in capacity of about 1 percent.

This highly critical dependence of capacity on dimensional tolerances causes great difficulty in fabrication of such devices. Thus, it is possible that if the piston fits perfectly (and is free-running) within the dielectric cylinder, the maximum capacity will be too high. If the piston diameter is reduced even slightly to reduce the maximum capacitance, the resulting air gap introduces a substantial instability into the unit. Thus, it is very hard to hold tolerances to get both a good fit and the correct capacitance to a given value, say 1 percent, in a precision device.

In accordance with the present invention, both mechanical fit and capacitance tolerance are readily achieved. Thus, the piston is first ground to fit precisely within the dielectric cylinder, without regard to capacitance, so long as the capacitance is higher than is needed. The piston surface is thereafter slotted with slots of small width and depth, thereby to reduce the effective capacitor electrode exposed to the stator electrode. These slots may be longitudinal, or parallel to the axis of the piston, or they may be helical in that they may form an angle to the axis of the piston. By way of example, longitudinal slots having a width of 6 mils and a depth of ¾ mil can be used to advantage, with as many slots used as needed.

In a typical capacitor which has a maximum capacitance of 282 picofarads, with a piston having a length of 1 inch and a diameter of 0.210 inch, a single such slot involves about 1 percent of the area of the piston. However, since the slot is shallow, it will reduce capacitance by about ½ percent, or about 1.5 picofarads. To obtain larger reductions in capacitance, additional slots are made. Thus, up to 20 slots have been used where large adjustments are needed. Note that wider cuts could be used in place of several narrower cuts. However, once the slotting jig is set up, it is easier to make a plurality of separate identical cuts than to change the cutting saw for a wider cut.

The use of such slots, which are substantially shallower than the thickness of the piston, can also control the shape of the curve of capacitance change versus piston position. Thus, nonlinearities in this curve, due to variations in the dielectric, can be eliminated by the judicious placement of short slots in the piston surface.

BRIEF DESCRIPTION OF THE DRAWINGS

FIG. 1 is a longitudinal cross-sectional view of a piston trimmer capacitor that can incorporate the present invention.

FIG. 2 is a cross-sectional view of FIG. 1 taken across section lines 2 — 2 in FIG. 1.

FIG. 2a is a cross-sectional view of FIG. 1 taken across section lines 2a — 2a in FIG. 1.

FIG. 3 is a side plan view of the piston of FIG. 1 when slotted in accordance with the present invention.

FIG. 4 is a side view of FIG. 3 to illustrate the slotted configuration.

DETAILED DESCRIPTION OF THE DRAWINGS

Referring first to FIGS. 1, 2 and 2a, there is shown a typical piston trimmer capacitor consisting of a cylindrical dielectric body 10 having a cylindrical conductive stator electrode 11 thereon. If desired, a conventional embedded stator electrode could be used. Note that any particular electrode configuration and mounting for electrode 11 could be used. Moreover, the material used for cylinder 10 may be of any type, such as glass, quartz, or the like. An end cap electrode 12 is then provided for making convenient electrical connection to stator 11. A central conductive piston 13, of conventional shell form having a wall thickness of about 70 mils and a length of about 1 inch, is disposed within cylinder 10. The fit within cylinder 10 should be of such tolerance that the air gap formed between the piston 13 and cylinder 10 is only enough to permit free longitudinal movement of the piston 13.

A shaft 14, which may be flexible, is appropriately secured to the end wall 13a of piston 13. Shaft 14 is terminated by a threaded head 15 which is threaded into an adjustment plate 16. Adjustment plate 16 is longitudinally movable in the direction of arrow 17 to move piston 13 into and out of dielectric form 10 to adjust the overlap of piston 13 and stator electrode 11, thereby to adjust capacitance.

A conductive support bushing 30 is then provided to support dielectric tube 10 and to serve as the other terminal of the capacitor. Thus, the bushing 30, which may be of brass, is provided with a central chamber 31 and a central opening 32 which can receive the piston 13 and shaft 14. An outer diameter region 33 of bushing 30 is threaded to permit mechanical connection of the capacitor to a support structure. Chamber 31 then receives a sliding contact structure 34 which consists of an elongated strip, bent to a circular shape, and having inwardly bent spring fingers which slidably engage the outer surface of piston 13. Since the body of sliding contact structure 34 is connected to bushing 30, the piston 13 is electrically connected to bushing 30, regardless of the longitudinal position of piston 13.

To connect the dielectric cylinder 10 to bushing 30, the cylinder 10 has a short metallic band 40 at its right-hand end in FIG. 1. A conductive washer 41 is placed over the outer periphery of cavity 31 to press the contact strip 34 in place, and a solder fillet 42 is formed from the bushing 30, over washer 41, to band 40, thus holding these parts together.

A plurality of similar capacitors may be operated from plate 16 so that the plurality of capacitors can be simultaneously varied in a radio tuning circuit, or the like. The head 15 has a screw-receiving slot 15a to permit adjustment of the longitudinal position of piston 13 relative to plate 16 so that the individual capacitors can be adjusted properly to track.

While the invention is to be described in connection with the type trimmer capacitor shown in FIGS. 1 and 2, it will be apparent that any operating mechanism can be used, and that the invention would be applicable to piston trimmers of the type shown in U. S. Pat. No. 3,360,697, in the name of Seiden, entitled TRIMMER CAPACITOR WITH DIRECT TRAVEL MECHANISM, and assigned to the assignee of the present invention.

In accordance with the invention, and as shown in FIGS. 3 and 4, the outer diameter of piston 13 is appropriately ground, or otherwise made sufficiently large to fit cylinder 10 with the closest tolerance which permits movement of the piston 13 relative to cylinder 10. A plurality of longitudinal slots, shown as slots 20, are then milled into the outer surface of the piston. These slots may have an angular component so that they are helical relative to the axis of the piston, as shown in dotted lines in FIG. 3 for the case of slot 20a.

Slots 20 have been made by an 0.006 inch slotting saw mounted in a small horizontal milling machine. When small width cuts are made, it is possible to make a plurality of slots without adjusting the position of piston 13 since small cuts need not be in the plane containing the axis of the piston 13. Thus, the piston can be slotted without a large number of adjustments of the machining equipment.

The slots are preferably of narrow width, for example 0.006 inch, and of very shallow depth, for example, ¾ mil. The slot bottoms may be square or round, depending on the shape of the cutting tool. Note that the slots are so shallow that they will not interfere with the mechanical strength of the piston since its wall thickness is great in comparison to the slot depth. However, slot depths up to about 0.01 inches have been used. The number of slots used depends on the necessary reduction in maximum capacity needed with the closely fitting piston and dielectric cylinder. Thus, for a piston having a diameter of 0.210 inch and a length of 1 inch, and a 2 mil thickness between the piston surface and electrode 11, the maximum capacitance may be 282 picofarads. Each slot 0.006 inch wide and ¾ mil deep will reduce capacitance by about 1.5 picofarads with sufficient slots being made to reduce the capacitance to the needed value.

Further in accordance with the invention, shorter cuts can be made to adjust for nonlinearities due particularly to variations in the thickness and quality of the dielectric 10 between the piston 13 and stator electrode 11, and for nonlinearities due to the inherent geometry of two concentric cylindrical electrodes.

Thus, shorter cuts 21 and 22, having a length of about .2 inch, can be made in the right-hand end of the piston (in FIGS. 1 and 3) to adjust for inherent nonlinearities due to geometry. Additional slots, such as slot 23 (FIG. 3), may be made where needed to adjust for undesired variations in the characteristic curves of a particular capacitor due to irregularities in the dielectric 10 and the like.

From the above, it will be seen that the invention permits the manufacture of piston trimmer capacitors in a practical and economical manner to meet highly precise specifications which could not previously be met. Moreover, the capacitor of the present invention has improved resistance to shock and vibration, because of the smaller permissible air gap between the piston and dielectric cylinder, and its characteristics are more repeatable than for prior art capacitors having necessarily larger air gaps.

Although this invention has been described with respect to its preferred embodiments, it should be understood that many variations and modifications will now be obvious to those skilled in the art, and it is preferred, therefore, that the scope of the invention be limited, not by the specific disclosure herein, but only by the appended claims.

The embodiments of the invention in which an exclusive privilege or property is claimed are defined as follows:

1. A piston trimmer capacitor comprising, in combination: a dielectric cylinder, a stator electrode secured to said dielectric cylinder, a conductive piston electrode disposed within said dielectric cylinder and axially movable with respect thereto, and defining a movable capacitance electrode relative to said stator electrode; said conductive piston electrode being closely fitted within said dielectric cylinder with a minimum possible tolerance sufficient only to allow longitudinal movement of said piston within said cylinder; said conductive piston comprising an elongated member having a uniform outer diameter along the length thereof; and at least one slot in the surface of said piston extending along at least a portion of the length of said piston and generally parallel to the axis of said piston; said slot having a width which is small relative to the diameter of said piston and a depth which is small relative to the radial thickness of said piston.

2. The conductive piston of claim 1 wherein said slot extends for the full length of said piston.

3. The conductive piston of claim 1 wherein said piston has a diameter of the order of about 0.2 inch and wherein said slot has a width of the order of about 0.01 inch and a depth of the order of 0.001 inch.

4. The capacitor of claim 2 wherein said piston contains a plurality of slots identical to said slot.

5. The capacitor of claim 4 wherein said plurality of slots each have a width which is about 1/20 of the diameter of said piston and a depth about 1/200th of the diameter of said piston.

6. The capacitor of claim 5 which includes at least one further slot therein having a relatively short length in comparison to the length of said piston.

7. The capacitor of claim 4 which further includes at least one further slot having a relatively short length compared to the length of said piston; said further slot terminating at one end of said piston.

8. The capacitor of claim 1 wherein said slot is helical about the axis of said piston.

9. The capacitor of claim 1 wherein the bottom of said slot is square in cross-section.

10. The capacitor of claim 1 wherein the bottom of said slot is circular in cross-section.

11. The capacitor of claim 5 which further includes at least one further slot having a relatively short length compared to the length of said piston; said further slot terminating at one end of said piston.

* * * * *